(12) United States Patent
Schwager et al.

(10) Patent No.: US 9,866,275 B2
(45) Date of Patent: Jan. 9, 2018

(54) MULTIPLE-INPUT AND MULTIPLE-OUTPUT MODEM FOR CONNECTION IN A POWER LINE COMMUNICATION NETWORK

(71) Applicant: SONY CORPORATION, Tokyo (JP)

(72) Inventors: Andreas Schwager, Waiblingen (DE); Werner Baeschlin, Oberrohrdorf (CH)

(73) Assignee: SONY CORPORATION, Tokyo (JP)

( * ) Notice: Subject to any disclaimer, the term of this patent is extended or adjusted under 35 U.S.C. 154(b) by 830 days.

(21) Appl. No.: 13/750,454

(22) Filed: Jan. 25, 2013

(65) Prior Publication Data

US 2013/0142233 A1 Jun. 6, 2013

Related U.S. Application Data

(63) Continuation of application No. 13/058,281, filed as application No. PCT/EP2009/003302 on May 8, 2009, now Pat. No. 9,112,590.

(30) Foreign Application Priority Data

Aug. 20, 2008 (EP) ..................................... 08014781

(51) Int. Cl.
*H04B 3/56* (2006.01)
*H04B 3/30* (2006.01)
*H04B 3/54* (2006.01)

(52) U.S. Cl.
CPC .................. *H04B 3/56* (2013.01); *H04B 3/30* (2013.01); *H04B 3/54* (2013.01); *H04B 2203/5466* (2013.01); *H04B 2203/5483* (2013.01)

(58) Field of Classification Search
CPC ..................................... H04B 3/54; H04B 3/56
(Continued)

(56) References Cited

U.S. PATENT DOCUMENTS 4,402,028 A * 8/1983 Udren .............................. 367/36
5,717,685 A * 2/1998 Abraham ..................... 370/276
(Continued)

FOREIGN PATENT DOCUMENTS

CN 1826736 A 8/2006
EP 1 858 174 11/2007
(Continued)

OTHER PUBLICATIONS

International Search Report dated Aug. 14, 2009 in PCT/EP09/03302 filed May 8, 2009.
(Continued)

*Primary Examiner* — Adi Amrany
(74) *Attorney, Agent, or Firm* — Oblon, McClelland, Maier & Neustadt, L.L.P.

(57) ABSTRACT

A device for determining a common-mode signal in a power line communication network. The device includes a first line, a second line, and a third line that are connected to a first terminal, to a second terminal, and to a third terminal, respectively. The first, the second, and the third terminal are configured to be connected to a phase line, a neutral line, and a protective ground line of the power line communication network, respectively. The device further includes a common-mode choke configured to couple out the common signal from the first, second, and third line, and the common-mode choke is connected to a termination impedance which is higher than an impedance of the power line communication network.

20 Claims, 5 Drawing Sheets

(58) Field of Classification Search
USPC .......................................................... 307/3
See application file for complete search history.

(56) References Cited

U.S. PATENT DOCUMENTS

| | | | | |
|---|---|---|---|---|
| 6,064,253 | A * | 5/2000 | Faulkner | H03F 3/604 |
| | | | | 327/560 |
| 6,122,183 | A * | 9/2000 | He et al. | 363/44 |
| 6,771,083 | B1 * | 8/2004 | Habermehl | G01D 5/18 |
| | | | | 324/727 |
| 7,430,291 | B2 * | 9/2008 | Washburn et al. | 379/398 |
| 7,609,492 | B2 * | 10/2009 | Maier | 361/42 |
| 7,667,988 | B2 * | 2/2010 | Haeberle et al. | 363/39 |
| 8,063,768 | B2 * | 11/2011 | Akeboshi et al. | 340/538 |
| 8,265,197 | B2 * | 9/2012 | Kim et al. | 375/296 |
| 2002/0171473 | A1 * | 11/2002 | Pelly | 327/552 |
| 2004/0135676 | A1 | 7/2004 | Berkman et al. | |
| 2005/0024015 | A1 * | 2/2005 | Houldsworth | H02J 7/0016 |
| | | | | 320/119 |
| 2005/0053229 | A1 | 3/2005 | Tsatsanis et al. | |
| 2005/0232412 | A1 | 10/2005 | Ichihara et al. | |
| 2006/0202640 | A1 * | 9/2006 | Alexandrov | H05B 37/0263 |
| | | | | 315/291 |
| 2007/0159860 | A1 * | 7/2007 | Haeberle et al. | 363/44 |
| 2007/0268989 | A1 * | 11/2007 | Schwager | H04B 3/30 |
| | | | | 375/349 |
| 2008/0057866 | A1 | 3/2008 | Schwager et al. | |
| 2008/0273613 | A1 * | 11/2008 | Kol | H04B 3/54 |
| | | | | 375/260 |
| 2009/0060060 | A1 | 3/2009 | Stadelmeier et al. | |
| 2009/0067614 | A1 * | 3/2009 | Washburn et al. | 379/398 |
| 2009/0161784 | A1 | 6/2009 | Stadelmeier et al. | |
| 2009/0213020 | A1 * | 8/2009 | Rentz | H01Q 5/00 |
| | | | | 343/722 |
| 2010/0061433 | A1 | 3/2010 | Stadelmeier et al. | |
| 2010/0308851 | A1 | 12/2010 | Schwager et al. | |
| 2011/0019758 | A1 | 1/2011 | Stadelmeier et al. | |

FOREIGN PATENT DOCUMENTS

| | | |
|---|---|---|
| JP | 2008236817 A * | 10/2008 |
| WO | WO 2005/101771 | 10/2005 |

OTHER PUBLICATIONS

Chinese Office Action dated May 28, 2013, in China Patent Application No. 200980132518.8 (with English translation).

Zhipeng Zhao, et al., "Research on EMI Filter Circuit of Power Line Carrier Communication", Modern Electronics Technique, No. 11, Jun. 30, 2008, pp. 170-171, (with English Abstract).

* cited by examiner

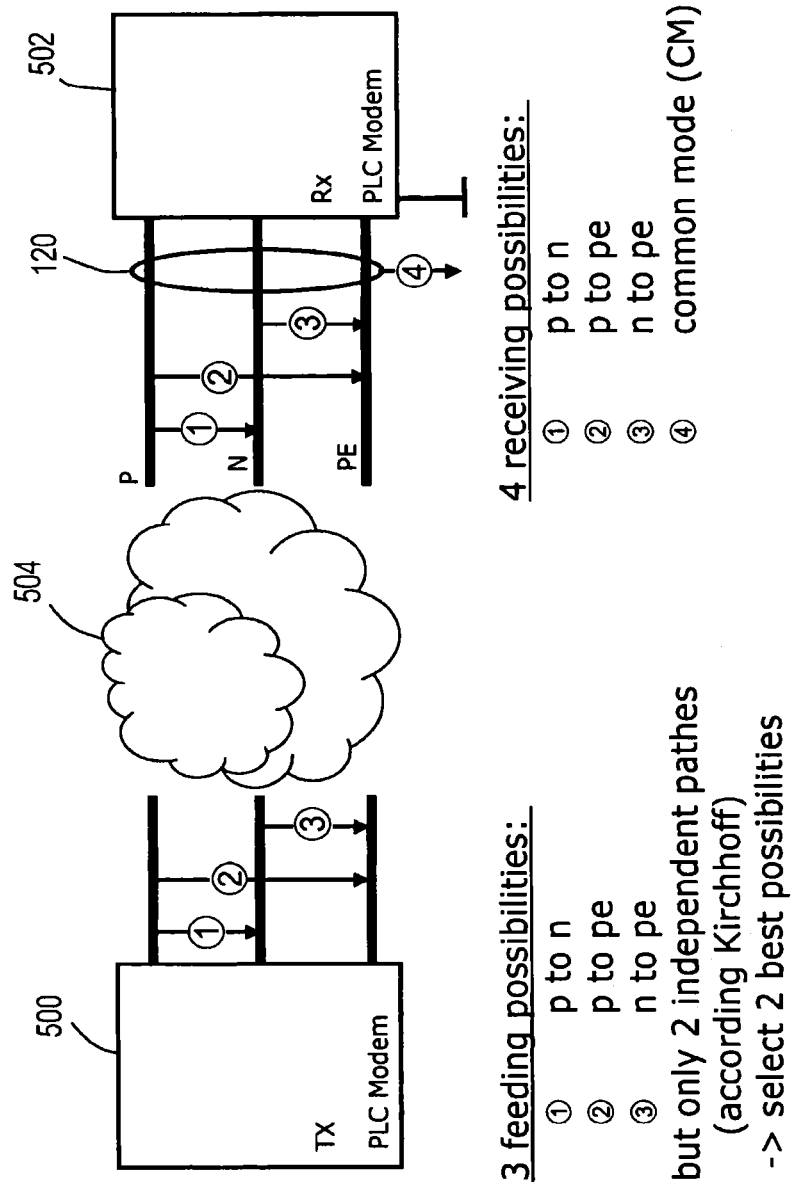

MULTIPLE-INPUT AND MULTIPLE-OUTPUT MODEM FOR CONNECTION IN A POWER LINE COMMUNICATION NETWORK

CROSS REFERENCES TO RELATED APPLICATIONS

This application is a continuation of U.S. Ser. No. 13/058,281, filed May 5, 2011, which is a national stage of PCT Application No. PCT/EP2009/003302, filed May 8, 2009, and claims the benefit of priority under 35 U.S.C. §119 from European Patent Application 08014781.2, filed Aug. 20, 2008. The entire content of each of the foregoing applications is hereby incorporated by reference herein.

An embodiment of the invention relates to a device for determining a common-mode signal in a power line communication network.

BACKGROUND

Power line communication (PLC), also called mains communication, power line transmission or power line telecommunication (PLT), broadband power line (BPL), power band or power line networking (PLN) is a term describing several different systems for using power distribution wires for simultaneous distribution of data. A carrier can communicate voice and data by superimposing an analog signal of the standard 50 or 60 Hz alternating current (AC). For indoor applications, PLC equipment can use household electrical power wiring as a transmission medium. This is a technique used e.g. for home networking or in home automation for remote control of lighting and appliances without installation of additional wiring.

In standard PLC systems the signals are transmitted and received in a differential-mode (DM). Differential-mode signaling is a method of transmitting information over pairs of wires. At DM signaling one wire carries signal and the other wire carries the inverse of the signal, so that the sum of the voltages to ground on the two wires is always assumed to be zero. PLC modems therefore inject a DM signal between a neutral line and a phase line of an outlet of the power line network of the household for communication purposes. Another PLC modem can receive such DM signals at another outlet and use the DM signal for controlling an appliance associated with the receiving PLC modem.

At in-house power line grids, there are asymmetric elements between the phase line and the neutral line, like e.g. an open light switch, a current bar and a fuse cabinet, branches etc. At these asymmetric elements, the DM signals injected by PLC modems are converted to common-mode (CM) signals. Multiple input multiple output (MIMO) PLC modems can use different channels, in particular also common-mode signals, in order to enhance the coverage of PLC systems.

Therefore, there is need for an improved device for a determining a common-mode signal in a power line communication network.

SUMMARY

It is an object of the invention to provide a device for determining a common-mode signal in a power line communication network with an improved ability to detect common-mode signals.

This object is solved via device according to claim 1.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of the embodiments will be readily appreciated, as they become better understood by reference to the following detailed description. The elements of the drawings are not necessarily to scale relative to each other. Like reference numerals designate corresponding similar parts.

FIG. 5 shows a schematic diagram for explaining the reception of multiple-input multiple-output signals with an embodiment of the invention.

DETAILED DESCRIPTION

In the following, embodiments of the invention are described. It is important to note that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
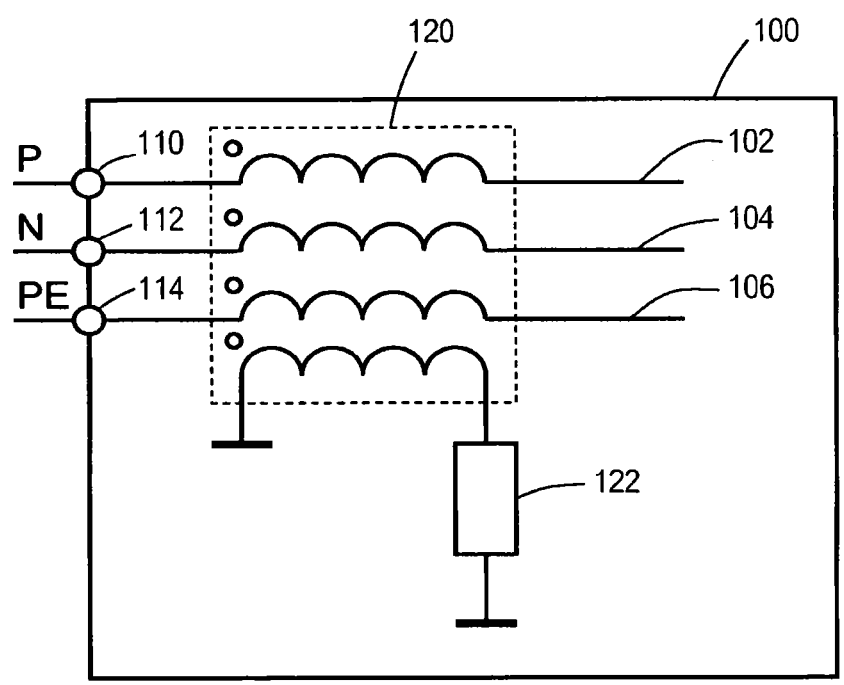
FIG. 1 shows a schematic circuit diagram of an embodiment of the invention.

In FIG. 1 a schematic circuit diagram of a device 100 for determining a common-mode signal in a power line communication network is depicted. The device 100 might be, for instance, a probe in order to determine common-mode ingress in a DM power line system. The device 100 might be as well a part of a power line modem that receives power line signals.

The device 100 comprises a first line 102, a second line 104 and a third line 106 which are connected to a first terminal 110, to a second terminal 112 and to a third terminal 114, respectively. A phase line P might be connected to the first terminal 110, a neutral line N might be connected to a second terminal 112 and a protective earth line PE might be connected to the third terminal 114.

The device 100 includes a common-mode choke 120 configured to couple out the common-mode signal from the first line 102, the second line 104 and the third line 106.

The common-mode choke 120 is connected to a termination impedance 122 which is higher than an impedance of the power line communication network. The power line communication network comprises all lines and appliances and devices connected to the phase line P, to the neutral line N and to the protective earth line PE.

When using a termination impedance 122 with high impedance, e.g. higher than an impedance of the power line communication network, DM signals transmitted over the phase line P, the neutral line N and the protective earth line PE and, correspondingly, over the first line 102, the second line 104 and the third line 106 are less influenced than by using a termination impedance which is considerably lower, e.g. adapted to an impedance of the power line communication network, e.g. 50 to 150 Ohm.

Figure 2:
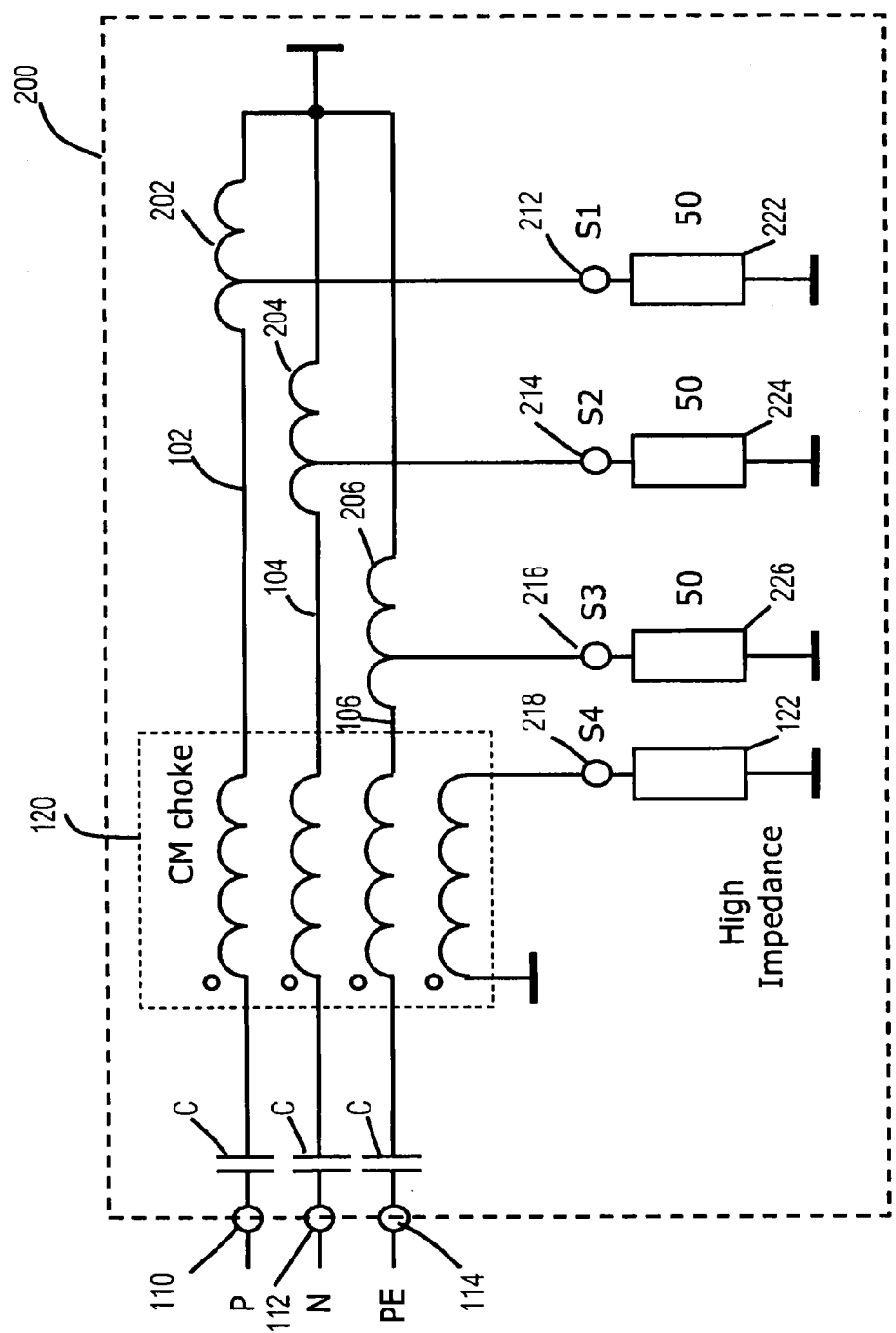
FIG. 2 shows a schematic circuit diagram of a further embodiment of the invention.

In FIG. 2 a schematic circuit diagram of a further device 200 for determining a common-mode signal is depicted. The first line 102, the second line 104 and the third line 106 are connected to the first terminal 110, the second terminal 112 and the third terminal 114 by coupling capacitors C, respectively. The coupling capacitor C serves to isolate the device 200 against direct current signal on the phase line P, the neutral line N and the protective earth line PE.

The common-mode choke 120 is wrapped around the first line 102, the second line 104 and a third line 106 and connected to a termination impedance 122 which is higher than the impedance of the power line communication network.

The first line 102 is connected via a first transformer 202 to ground, the second line 104 is connected via a second transformer 204 to ground and the third line 106 is connected via a third transformer 206 to ground. A first output 212 is connected to the first transformer 202 (impedance), a second output 214 is connected to the second transformer 204 (impedance) and a third output 216 is connected to the third transformer 206 (impedance). The first output 212, the second output 214 and the third output 216 are terminated with termination impedances 222, 224, 226, which might have an impedance matching to the impedance of the power line network (e.g. of 50 Ohm), each. The first output 212, the second output 214, and the third output 216 are used to provide the differential-mode signals which are present on the first line 102, the second line 104 and the third line 106.

A fourth output 218 is connected to the common-mode choke 120. The fourth output 218 is configured to provide the common-mode signal present on the first line 102, the second line 104 and the third line 106.

The termination impedance 122 might be realized as an input impedance of an analog-to-digital converter connected to the common-mode choke 120. The input impedance of an analog-to-digital converter might be governed by the gate of a CMOS transistor. The value for such input impedances shall be maximal and can normally be between 1 kΩ and 3 kΩ.

The configuration in FIG. 2 is also known as a star topology. However, it is also possible to use a triangle topology.

Figure 3:
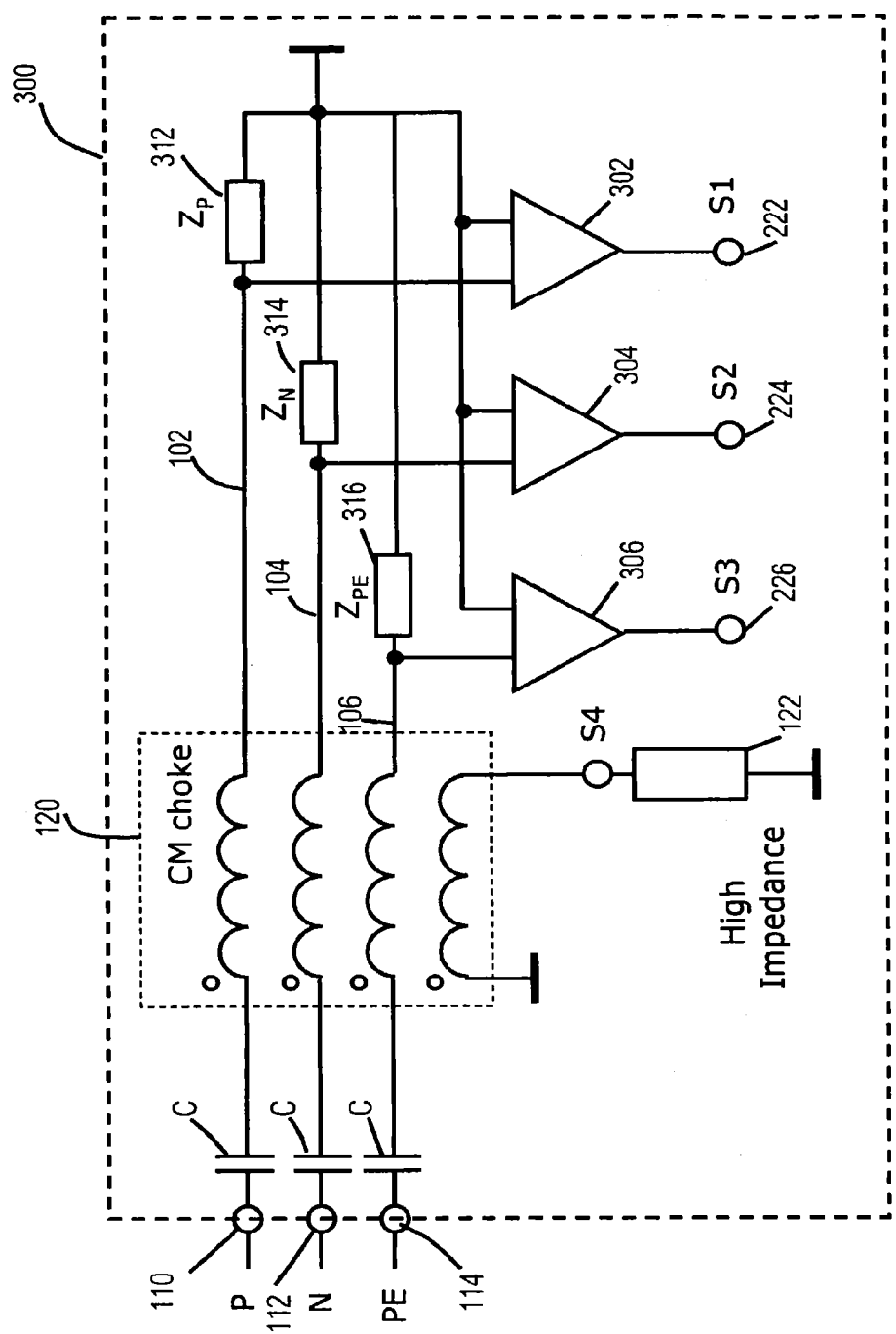
FIG. 3 shows a schematic circuit diagram of a further embodiment of the invention.

In FIG. 3 a further schematic circuit diagram of a further device 300 for determining a common-mode signal is depicted. In the device 300 the determination of the differential-mode signals is performed by a first amplifier 302, a second amplifier 304 and a third amplifier 306.

One of the inputs of the first amplifier 302 the second amplifier 304 and the third amplifier 306 is connected to ground. The other input of the first amplifier 302 is connected to the first line 102 between the common-mode choke 120 and a first impedance 312. The second input of the second amplifier 304 is connected to the second line 104 between the common-mode choke 120 and a second impedance 314. The second input of the third amplifier 306 is connected to the third line 106 between the common-mode choke 120 and a third impedance 316. The outputs of the first amplifier 302, the second amplifier 304 and the third amplifier 306 are connected to the first output 222 to the second output 224 and to the third output 226, respectively.

With these amplifiers it is possible to determine the differential-mode signals on the first line 102, the second line 104 and the third line 106 at the first output 222, the second output 224 and the third output 226. The first amplifier 302, the second amplifier 304 and the third amplifier 306 are arranged in a star topology. However, also in arrangement in a triangle topology is possible.

Figure 4:
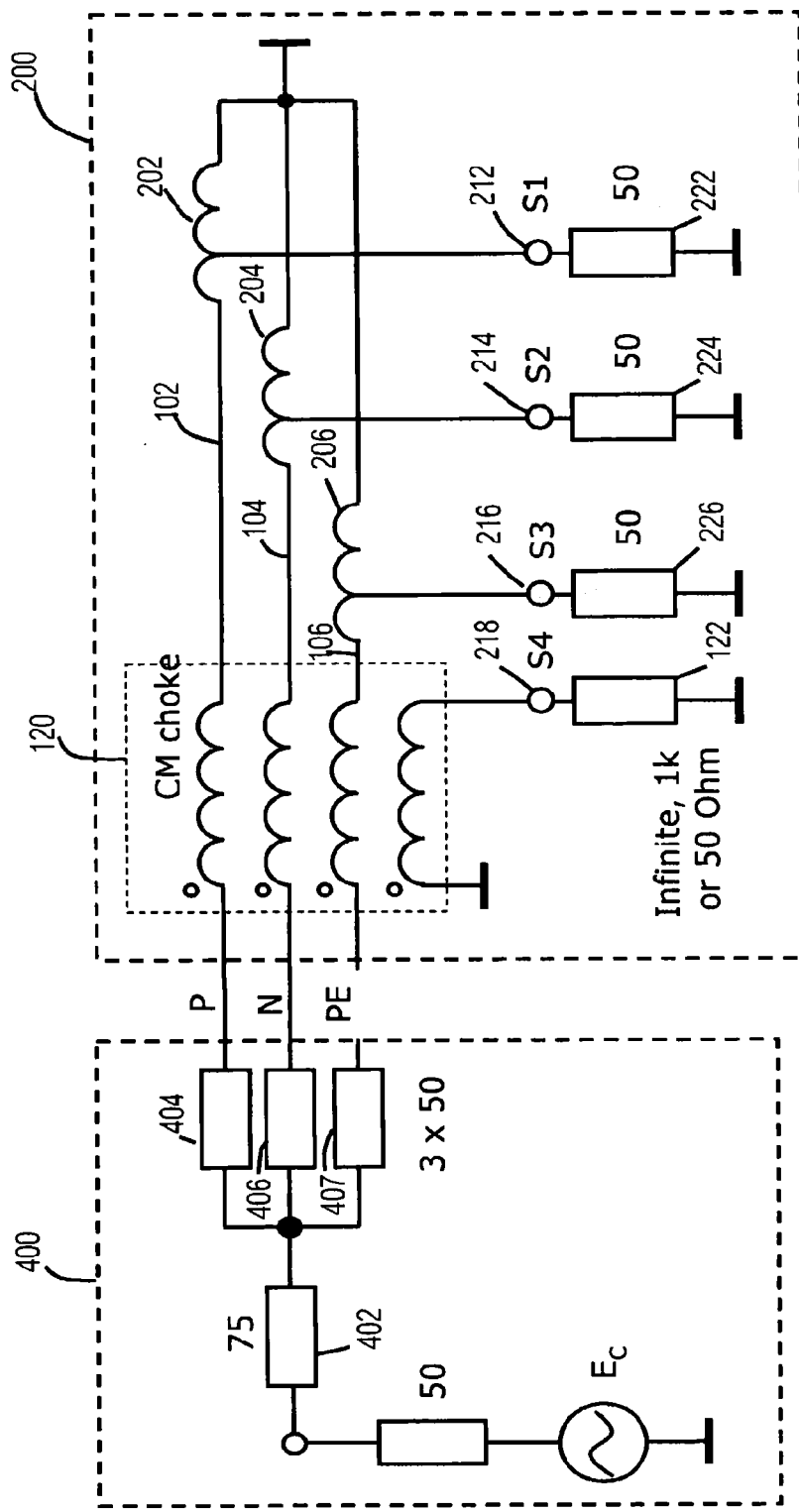
FIG. 4 shows a schematic circuit diagram of a further embodiment of the invention.

In FIG. 4 a measurement setup is depicted to determine the influence of the value of the termination impedance 122 to the isolation or divergence of the differential-mode signals on the first line 102, the second line 104 and the third line 106. A generator 400 with a current or voltage source EC and an internal impedance of 50 Ohms further comprises a fourth impedance 402 of 75 Ohm common to the phase line P, the neutral line N and the protective earth line PE and a fifth impedance 404, a sixth impedance 406 and a seventh impedance 407 of 50 Ohm each, wherein the fifth impedance 404 situated in the phase line P, the sixth impedance 406 is situated in the neutral line N and the seventh impedance 407 is situated in the protective earth line PE. Thus, the generator 400 has an assumed differential-mode impedance of 100 Ohm and a common-mode impedance of 150 Ohm (if the terminal of the protective earth line PE is left open).

A verification with the network analyzer showed that in case the termination impedance 122 is 50 Ohm only, only a small isolation between the signals on the first line 102 and the third line 106 is present. However, the isolation between the differential-mode signals on the different lines 102, 104, 106 is higher, and thus the coupling lower, if the termination impedance is higher, e.g. 1 kΩ or infinite.

In FIG. 5 a schematic diagram showing the feeding possibilities and receiving possibilities in a multiple input multiple output (MIMO) scheme are depicted. A first power line communication modem 500 transmits signals to a second power line communication modem 502 over a power line communication network 504. There are three possibilities for feeding signals into the power line communication network 504.

A differential-mode signal might be fed between the phase line P and the neutral line N, a differential-mode signal might be fed between the phase line P and the protective earth line PE and a differential-mode signal might be fed between the neutral line N and the protective earth line PE. Due to Kirchhoff's laws only two independent paths are possible. It is advisable to use the two best possibilities with respect to e.g. noise properties in order to feed the signals into the power line communication network 504.

On the receiving side there are four possibilities to receive the signals. It is possible to determine the differential-mode signal between phase line and neutral line, to determine the differential-mode signal between phase line P and protective earth PE and to determine the differential-mode signal between the neutral line N and the protective earth line PE. In addition it is possible to detect the common-mode signal CM by using e.g. the common-mode choke 120.

With a proposed device for determining a common-mode signal and a power line communication network there is no longer a lost isolation between the three differential-modes (balanced or symmetrically) between the lines.

Multiple-input multiple-output (MIMO) communication signals are fed or received symmetrically or balanced between the phase line P and the neutral line N, the phase line P and the protective earth line PE and/or the neutral line N and the protective earth line PE. Multiple-input multiple-output technologies show maximum gain compared to signal input signal output schemes if individual signals provide maximum divergence.

With the proposed device a coupling between individual differential-mode signals is reduced, thus increasing the performance of MIMO technology.

Although specific embodiments have been illustrated and described herein, it will be appreciated by those of ordinary skill in the art that a variety of alternate and equivalent implementations may be substituted for the specific embodiments shown described without departing from the scope of the described embodiments. This application is intended to cover any adaptations of variations of the specific embodiments discussed herein. Therefore, it is intended that this invention be limited only by the claims and the equivalence thereof.

What is claimed is:

1. A multiple-input and multiple-output (MIMO) Power Line Communication (PLC) modem for a PLC network, comprising:
    a first line coupled to a phase line input terminal of the MIMO PLC modem, the first line being connectable to a phase line of the PLC network;
    a second line coupled to a neutral line input terminal of the MIMO PLC modem, the second line being connectable to a neutral line of the PLC network;
    a third line connected to a protective earth line input terminal of the MIMO PLC modem, the third line being connectable to a protective earth line of the PLC network;
    a first capacitor coupled in line with the first line and connected in series with the phase line input terminal and a first inductive element;
    a second capacitor coupled in line with the second line and connected in series with the neutral line input terminal and a second inductive element different from the first inductive element;
    a third capacitor coupled in line with the third line and connected in series with the protective earth line input terminal and a third inductive element different from the first inductive element and the second inductive element; and
    a first transformer, a second transformer, and a third transformer connected in star topology to a first output terminal, a second output terminal, and a third output terminal, respectively,
    wherein the phase line input terminal, the neutral line input terminal, and the protective earth line input terminal, collectively, are constructed and arranged for connection to the phase line, the neutral line, and the protective earth line, respectively, of the PLC network,
    wherein at least one element is coupled between the first line and the second line,
    wherein the first capacitor is coupled between the phase line input terminal and the first transformer,
    wherein the second capacitor is coupled between the neutral line input terminal and the second transformer, and
    wherein the third capacitor is coupled between the protective earth line input terminal and the third transformer.

2. The modem according to claim 1,
    wherein said at least one element is an asymmetrical element, and
    wherein neither the first capacitor nor the second capacitor has associated therewith a discharge resistor.

3. The modem according to claim 1,
    wherein each of the first, second, and third capacitors is coupled as an isolation capacitor to isolate said MIMO PLC modem against direct current signals in the respective first, second, and third lines via the phase line input terminal, the neutral line input terminal, and the protective earth line input terminal, respectively.

4. The modem according to claim 1,
    wherein the first capacitor is directly connected to the phase line input terminal,
    wherein the second capacitor is directly connected to the neutral line input terminal, and
    wherein the third capacitor is directly connected to the protective earth line input terminal.

5. The modem according to claim 4,
    wherein a first end of the first capacitor is directly connected to the phase line input terminal, and a second end of the first capacitor is connected to the first inductive element, and
    wherein a first end of the second capacitor is directly connected to the neutral line input terminal, and a second end of the second capacitor is connected to the second inductive element.

6. The modem according to claim 5,
    wherein a first end of the third capacitor is directly connected to the protective earth line input terminal, and a second end of the third capacitor is connected to the third inductive element.

7. The modem according to claim 5,
    wherein each of the first and second inductive elements is a transformer.

8. The modem according to claim 5,
    wherein the second end of the first capacitor is connected to the first inductive element via a first portion of a choke, and
    wherein the second end of the second capacitor is connected to the second inductive element via a second portion of the choke.

9. The modem according to claim 1,
    wherein first and second ends of the first capacitor are directly connected to the first line,
    wherein first and second ends of the second capacitor are directly connected to the second line, and
    wherein first and second ends of the third capacitor are directly connected to the third line.

10. The modem according to claim 9,
    wherein the first end of the first capacitor is directly connected to the phase line input terminal, and the second end of the first capacitor is connected to the first inductive element, and
    wherein the first end of the second capacitor is directly connected to the neutral line input terminal, and the second end of the second capacitor is connected to the second inductive element.

11. The modem according to claim 10,
    wherein the first end of the third capacitor is directly connected to the protective earth line input terminal, and the second end of the third capacitor is connected to the third inductive element.

12. The modem according to claim 10,
    wherein the first inductive element is a transformer.

13. The modem according to claim 10,
    wherein the second end of the first capacitor is connected to the first inductive element via a choke, and wherein the second end of the second capacitor is connected to the second inductive element via the choke.

14. The modem according to claim 1,
wherein a number of inputs to said MIMO PLC modem differs from a number of outputs from said MIMO PLC modem.

15. The modem according to claim 1,
wherein said MIMO PLC modem is configured to receive, via the phase line input terminal, the neutral line input terminal, and the protective earth line input terminal, symmetrical or balanced input communication signals and has a plurality of inputs and a plurality of outputs.

16. The modem according to claim 1,
wherein the third capacitor is connected to the protective earth line input terminal and a filter.

17. The modem according to claim 16,
wherein the filter is a high pass filter.

18. The modem according to claim 1,
wherein the at least one element is coupled directly to the phase line input terminal and the neutral line input terminal and coupled to the first and second transformers via the first and second capacitors, respectively.

19. A multiple-input and multiple-output (MIMO) Power Line Communication (PLC) modem for a PLC network, comprising:
a first line coupled to a phase line input terminal of the MIMO PLC modem, the first line being connectable to a phase line of the PLC network;
a second line coupled to a neutral line input terminal of the MIMO PLC modem, the second line being connectable to a neutral line of the PLC network;
a third line connected to a protective earth line input terminal of the MIMO PLC modem, the third line being connectable to a protective earth line of the PLC network;
a first capacitor coupled in line with the first line and connected in series with the phase line input terminal and a first inductive element;
a second capacitor coupled in line with the second line and connected in series with the neutral line input terminal and a second inductive element different from the first inductive element;
a third capacitor coupled in line with the third line and connected in series with the protective earth line input terminal and a third inductive element different from the first inductive element and the second inductive element; and
a first transformer, a second transformer different from the first transformer, and a third transformer different from the first and second transformers, the first transformer, the second transformer, and the third transformer being connected to the first line, the second line, and the third line, respectively,
wherein the phase line input terminal, the neutral line input terminal, and the protective earth line input terminal, collectively, are constructed and arranged for connection to the phase line, the neutral line, and the protective earth line, respectively, of the PLC network.

20. The modem according to claim 19, further comprising at least one element coupled between the first line and the second line,
wherein the first capacitor is coupled between the phase line input terminal and the first transformer,
wherein the second capacitor is coupled between the neutral line input terminal and the second transformer, and
wherein the third capacitor is coupled between the protective earth line input terminal and the third transformer.

* * * * *